United States Patent [19]

Milligan et al.

[11] Patent Number: 4,595,706

[45] Date of Patent: Jun. 17, 1986

[54] ANTI-STATIC PACKING MATERIAL

[75] Inventors: Dennis J. Milligan, Lake Jackson; Phil Rolland, Dallas, both of Tex.

[73] Assignee: The Dow Chemical Company, Midland, Mich.

[21] Appl. No.: 773,901

[22] Filed: Sep. 9, 1985

[51] Int. Cl.$^4$ ............................ C08J 9/36; C08J 9/38
[52] U.S. Cl. ................... 521/53; 428/304.4; 428/305.5; 428/308.8; 428/310.5; 521/143; 521/146
[58] Field of Search ............... 521/53, 143, 146, 155; 428/304.4, 305.5, 308.8, 310.5

[56] References Cited

U.S. PATENT DOCUMENTS 4,490,487 12/1984 Halcour et al. .................. 521/53

Primary Examiner—Morton Foelak
Attorney, Agent, or Firm—G. R. Baker

[57] ABSTRACT

A process and the product made thereby are disclosed in the preferred form of this process wherein a polymeric packing material is first fluorinated at ambient temperature for an interval of contact with elemental fluorine. Then, contact with a strong base converts the polymer into conjugated double bonds, reducing electrical resistance. The double bonds yield a surface layer able to controllably conduct electrical current.

12 Claims, No Drawings

ANTI-STATIC PACKING MATERIAL

BACKGROUND OF THE DISCLOSURE

This disclosure is directed to a process to convert polymeric packing materials into completed packing particles which are electrically conductive across the surface. More particularly, the present procedure accomplishes conversion of polymeric surfaces on packing materials into conductive surfaces at milder conditions and in shorter treatment times during the practice of the improved process of this disclosure. The polymeric packing material is foamed polymer (described below) formed into peanuts of random sizes and shapes. For many applications, the foam is relatively light weight, and a typical density is in the range of about 2 to 6 pounds per cubic foot of foamed material. When formed into peanuts including discs, spheres or other shapes loosely heaped in a packing container or carton, the effective or net density is typically even less by perhaps 20 to 40%, depending on peanut shape irregularity.

The irregular shape is an advantage as a packing material. There is a problem in handling polymeric packing material, as might arise on pouring loose particles into a packing crate. The random, sliding movement may build up static electrical charges on the surfaces of the poured particles, thereby causing light particles to stick together. Indeed, this can also cause static electricity to damage the item being shipped in the packing crate. While some items are not harmed by the static electrical charge, many products requiring protection by foamed packing material are very sensitive to electrical charge. This is especially the case for electronic equipment having integrated circuit components. Often, the peak voltage collected on a surface is surprisingly high, and will remain high for a long time. The static charge is stored until it has an opportunity to bleed across the accumulated peanuts to restore an electrically neutral condition to the previously charged area. While the total charge is extremely small, the extremely high resistance prevents current flow, causing the charge to linger on the surface for a long time and creates a risk of damage to the cargo protected by the packing material.

An important advantage of the present procedure is the ability to manufacture packing materials with a controlled surface conductivity, enabling charge bleed off. This ability to bleed off charge is obtained by forming a controllably conductive layer on packing particles. Assume that the packing material is randomly shaped peanuts having a range of sizes. The surface is modified without defeating the features of packing materials, namely, a sacrifical peanut of specified shape and density to enable the peanuts to protect cargo nested in the peanuts. In other words, the foamed packing material will not accumulate and hold a charge indefinitely and will not electrically cluster or clump, enabling the peanuts to pour freely from a container.

Perhaps a definition of various electrical conductivities will assist in identifying benefits of the present process. In general terms, a material which has an electrical conductivity of $10^{-15}$/ohm cm is defined as an insulator. Any material which is less conductive than this can be treated as an insulator material. Where the conductivity is typically in the range of about $10^{-6}$ to about $10^{-9}$, an antistatic material is provided. An EMI shielding polymer typically will have a conductivity of about the range of $10^{-2}$ to about $10^{-6}$. A conductivity of about 1 is typical of silicon and the conductivity of graphite is about $10^6$. Conductive metals such as silver and copper typically have a conductivity of about $10^9$. The present procedure enables manufacture of polymeric packing materials which, subject to control of the process, can yield antistatic materials or EMI shielding materials.

Utilizing a feed stock which includes selected polymers, changes in the chemical structure can be made through the various steps of this disclosure for obtaining a conjugated double bond system in the polymer chain. The feed stock is polymers or co-polymers including polyethylene, polystyrene, polyolefin, and polyurethane in the foamed state. The product will be referred to generally as polymeric packing material.

The method of treatment disclosed has a great advantage in intermediate step fluorination which prepares the polymeric packing material (both polymer and co-polymer system) for subsequent treatment. By contrast with the present disclosure, it is possible to expose selected polymers to a strong base such as ethylenediamine (EDA) for many hours at ambient temperature with little or no reaction. This prior process can be forced (by high temperature or pressure) to yield a polymer which is altered in conductivity. The present disclosure describes a dehydrohalogenation step which proceeds in quick order at ambient conditions. This disclosure sets forth a fluorine treatment enabling subsequent dehydrohalogenation at room temperature in short order, perhaps a few minutes. Absent the preliminary fluorine treatment, the only way to force the conversion through dehydrohalogenation is to utilize excessive temperatures of perhaps 100° C. or higher and much longer contact intervals with the EDA to accomplish dehydrohalogenation.

It is one object of the present procedure to therefore provide a preliminary step to assist in conducting the dehydrohalogenation step in the presence of a strong base (EDA is typical) and to obtain controllable surface penetration and controllable conversion to selected ranges of electrical conductivity on polymeric packing material.

Other advantages of the present procedure will become more readily apparent upon an evaluation of the process described hereinbelow. Moreover, a product is manufactured as will be described. Various examples of the method of manufacture are also set forth. In like fashion, specific tests describing the electrical conductivity are also included.

DETAILED DESCRIPTION OF THE PREFERRED EMBODIMENT

The method of the present disclosure relates to the conversion of polymeric packing material (PPM). Polyethylene, polystyrene, polyolefin and polyurethane, either as a single polymer or in a co-polymer system with other polymers, are susceptible to the present treatment. To the degree that the co-polymer system involves polymers not converted by the present treatment, the change in conductivity may be altered depending on the nature and percentage of the other polymers making up the polymer system.

EXAMPLE I

A polystyrene foam ball of about one gram weight was placed in a nickel lined reactor. Two or three purges with nitrogen removed all oxygen and permitted the start of fluoridation. The gas flow was introduced at ambient temperature for two hours and was about 10% fluorine gas mixed with about 90% inert gas (helium). The flow rate was about 60 sccm. The polystyrene ball was removed after two hours, washed in milli-Q water and dried in a vacuum oven, a typical drying cycle extending about 45 minutes at a temperature of about 60° C.

Then, the polystyrene foam ball was dipped in a strong base (EDA is preferred). The base contact time was short, only a few minutes at ambient temperature. The ball was then removed and dried. The surface showed a brown color and the ball was slightly heavier than at the beginning. Typical base treatment steps are exposure for 30 minutes followed by washing with milli-Q water and vacuum drying for 3 hours at 55° C. Testing showed $10^{-7}$ to $10^{-5}$/ohm cm conductivity using the ASTMF-43-78 procedure.

PROCEDURAL STEPS

Prior to treatment in a closed chamber, it is necessary to remove oxygen from the chamber. Typically, a chamber is evacuated with an inert gas for two to three cycles at which time the chamber may be deemed free of oxygen. A typical flow rate of mixed 10% fluorine and 90% nitrogen or helium is continued for something up to three hours reaction time whereupon the fluorine flow is discontinued and the chamber is then purged with nitrogen or some other inert gas. After traces of fluorine are removed from the chamber, the reaction chamber can then be opened to enable removal of the treated polymer. The fluorine can be increased after the start to higher levels.

DESCRIPTION OF THE CONVERSION

Initially the polymeric packing material has a polymer chain (for polyethylene) of the general form:

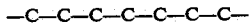

After exposure to fluorine in the reaction chamber, the polyethylene is then converted into the following general form:

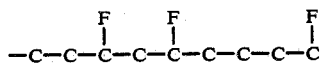

Thereafter, reaction with a strong base at room temperature for a short interval provides the controllably electrically conductive polymer featuring conjugated double bonds thus exemplified by:

The depth of the reaction wherein the conjugated double bonds are formed is (in part) evidenced by change in color. Typically, this last step is accomplished with approximately 99% pure EDA for times up to about 30 minutes at ambient temperature. Dilute base can be used. However, the double bonding is quick to show reaction by coloration and hence it is believed that the conjugated double bonds are formed rapidly, at least at the surface chains. Through the use of ESCA (Electron Spectroscopic Chemical Analysis), an increase in concentration of bound fluoride from nil to a specific level of fluoride can be verified. It is proposed that fluorination achieves substitution of fluorine for hydrogen on the chain. The treatment step preferably begins with fluorine and may process to mixtures of fluorine with other halogens; the process is said to be fluorine initiated, and may be continued usually with fluorine although some chlorine may be later used.

The depicted representation of polyethylene illustrates how conjugated double bonds are formed in the polymer. As mentioned earlier, other polymers can be included in the foamed packing material such as polystyrene, polyolefin or polyurethane, or co-polymer systems using any mix of these four polymers, or other polymers not impacted by the present process. In any event, the double bond inserted by this process changes the conductivity and such double bonds can be formed in the described polymers. To the extent the double bond insertion is accomplished, conductivity is modified; the modification depends on the number of double bond sites. Effective dehydrohalogenation is not only accomplished with EDA but it is also accomplished with NaOH and or with NaOCH$_3$. It would appear that dehydrohalogenation with EDA yields about one order of magnitude more conductive material than that obtained with alternate strong bases. To further change the electrical conductivity, temperature control during the dehydrohalogenation step would appear to vary the quantity of double bonding sites without seriously impacting the polymer. Thus, one of the process control factors is the temperature of the base and the duration of the exposure to of the base. It would appear from ESCA analysis that the dehydrohalogenation step removes a controllable percentage (even all if desired) of the fluorine present and is dependent on base strength, time and temperature. As will be understood, control of tests factors of the process yields a range of control over the conductivity of the treated polymeric packing material.

Utilizing suitable and known laboratory analytical techniques, when a foam is treated, there is a measurable surface conductive layer. In one procedure, a layer of about 40–50 microns thick was formed, having a dark brown color and displaying a highly oriented structure. Underneath, there was a second layer which was oriented structurally, typically yellow in color and perhaps 1.5 mm thick. Material beyond this layer comprised a third layer which is primarily unoriented and beige in color. These thicknesses may vary with density. Through the use of suitable spectroscopy particularly testing for halogen content, the fluorine seemed to be evident in only the first 40 or 50 microns thickness, that is, the layer which shows brown coloration. Thus, from the spectroscopic analysis, it is thought that both the physical orientation and the presence of conjugated double bonds in the chains contribute to controllable electroconductivity characteristics in the surface layer. This enables adjustment of the electroconductivity parameter over a range exemplified above ($10^{-9}$ to about $10^{-2}$), a range of about 7 orders of magnitude. Thus, the conductivity can be controlled depending on operative exposure times, strength of the base solution, temperature of the base solution, and factors regarding exposure of the polymeric packing material in the process steps. It is conjectured that the fluorine penetration into solid polymer material is thus controlled in the range of up to about 40–50 microns to accomplish surface conversion of electrical conductivity characteristics. This appears to also be dependent on foam bubble or cell diameter and whether the foam is open or closed cell foam.

Lewis acid treatment (I$_2$, BF$_3$ or H$_2$SO$_4$ are typical) can be used instead of fluorine in the contact process.

While the foregoing is directed to the preferred embodiment includes a representative procedures in the practice of the present disclosure, and describes the product obtained thereby, the scope is determined by the claims which follow.

What is claimed is:

1. A method of imparting surface conductivity to polymeric packing material, the method comprising a step of at least partially fluorinating to an effective depth of up to about 50 microns of the surface a foamed packing material of polyethylene, polystyrene, polyolefin, polyurethane and co-polymers thereof and a subsequent step of dehydrofluorinating by contact with a strong base.

2. The method of claim 1 wherein the fluorinating step occurs by contacting the foamed packing material with fluorine gas.

3. The method of claim 1 wherein the fluorinating gas is diluted by an inert gas.

4. The method of claim 1 wherein the dehydrofluorinating step occurs by contacting the packing material with a strongly basic solution including ethylenediamine, sodium hydroxide, or sodium methoxide.

5. The method of claim 1 wherein the treated packing material is washed and dried.

6. The method of claim 1 wherein the polymer is treated by contact with a Lewis acid.

7. The method of claim 1 including the steps of fabricating to a desired final shape of randomly sized particles before the dehydrohalogenating step.

8. The method of claim 1 including the step of placing the polymeric packing material in a closed reactor, initially purging the reactor to remove any oxygen therein, and thereafter conducting a flow of fluorine gas mixed with an inert gas into the reactor at ambient temperature.

9. The method of claim 8 including the subsequent step of contacting the treated polymeric packing material with a strong base solution to the degree necessary to obtain surface conversion of color in the polymeric packing material to form a brown surface layer thereon.

10. The method of claim 9 wherein the polymeric packing material at the surface is converted to provide conjugated double bonds in the polymeric chain yielding a surface layer having conductivity of $10^{-9}$/ohm cm or greater.

11. The method of claim 10 wherein the conductivity of the completed product is between about $10^{-9}$ to about $10^{-2}$/ohm cm.

12. The method of claim 8 wherein conductivity is through a surface layer of brown coloration of at least about 40 microns thick having an oriented structure.

* * * * *